Figure 1:
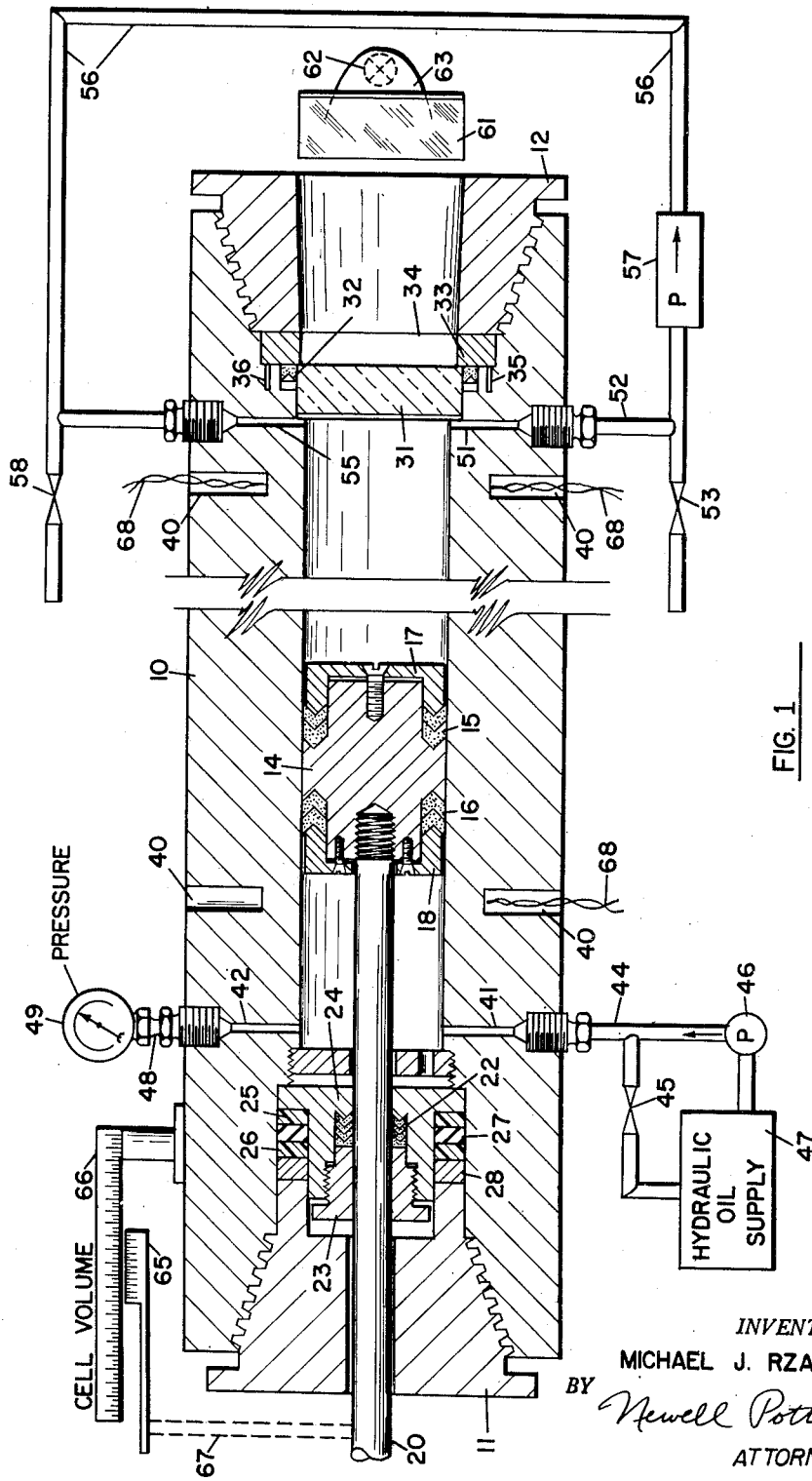

Dec. 15, 1953   M. J. RZASA   2,662,393
HIGH-PRESSURE WINDOWED CELL
Filed Dec. 29, 1950   2 Sheets-Sheet 1

INVENTOR:
MICHAEL J. RZASA
BY Newell Pottof
ATTORNEY

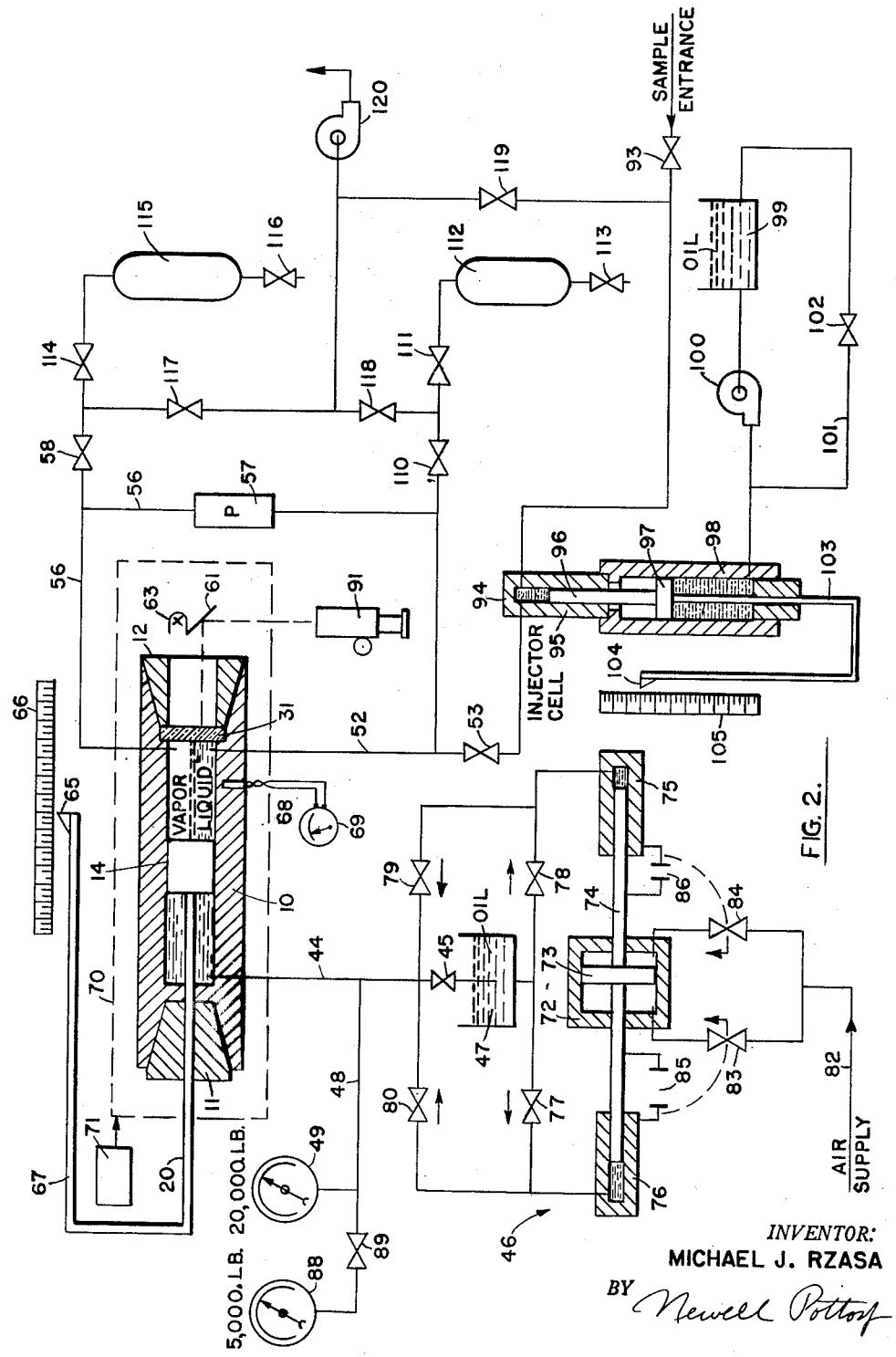

Patented Dec. 15, 1953

2,662,393

UNITED STATES PATENT OFFICE 2,662,393

HIGH-PRESSURE WINDOWED CELL

Michael J. Rzasa, Tulsa, Okla., assignor to Stanolind Oil and Gas Company, Tulsa, Okla., a corporation of Delaware Application December 29, 1950, Serial No. 203,288

4 Claims. (Cl. 73—23)

This invention relates to apparatus for testing fluids, such as mixtures of substances some of which are condensable from the gaseous to the liquid state under certain conditions of pressure and temperature. It is directed particularly to a high-pressure windowed cell for studying the phase conditions of such systems as mixtures of hydrocarbons found in gas, gas distillate, and oil reservoirs. Specifically, the invention is directed to a windowed, variable-volume cell for quantitatively studying, under a wide range of conditions of temperature and pressure, the phase-equilibrium conditions of mixtures of hydrocarbon or other fluids containing condensable components.

Phase equilibrium measurements on mixtures of such substances as hydrocarbons, some of which are gaseous and others of which are condensable under certain conditions of temperature and pressure, are useful for a number of purposes, such as for evaluating the recoverable liquid content of a given mixture or for determining the most efficient operating procedure for a maximum recovery of such a mixture from a given reservoir. The high-pressure testing cells which have been heretofore devised for studying such mixtures have been subject to certain limitations, such as a complete inability or only limited ability to view the contents of the cell, and have often required the use of such displacing liquids as mercury which are capable of reacting chemically with the components of some gaseous mixtures to be tested, as well as offering problems of handling or corrosion.

A primary object, accordingly, of my invention is to provide an improved form of windowed, variable-volume, high-pressure, testing cell for fluid mixtures containing both gaseous and liquid or condensable components. Some of the further and more specific objects and features of the cell of my invention are to avoid entirely the use of mercury as the confining medium, to provide complete visibility of the liquid and gaseous phases in a single field of view, to measure accurately very small volumes of liquid or vapor, to provide a very simple and accurate volume calibration, to provide agitation for the cell contents without the use of moving parts within the cell, and to provide for simply and quickly opening and closing the cell for purposes of cleaning or repair and maintenance. Other and further objects, uses, and advantages of the invention will become apparent as the description proceeds.

Stated briefly, the foregoing and other objects are accomplished by a cell in the form of a high-pressure cylinder oriented in a horizontal position with one end of the cylinder closed by a circular disc of transparent material completely supported by a metal disc except for a vertical viewing slot extending diametrically across the end of the cell. The movable boundary of the cell comprises a piston actuated by hydraulic oil pressure to vary the cell volume and the pressure on the sample contents. Surrounding and spaced somewhat from the outside of the cell cylinder is an insulating jacket within which air, maintained thermostatically at a desired temperature, is circulated to maintain the cell and contents at the desired temperature level. Agitation of the cell contents is accomplished by a small magnetically operated pump in a by-pass line operating at the cell pressure, which pump transfers fluid between the bottom and top of the cell.

This will be better understood by reference to the accompanying drawings forming a part of this application, in the different figures of which drawings the same numeral designates the same or a corresponding part. In these drawings:

Figure 1 is a cross-section view of the preferred embodiment of my invention; and Figure 2 shows diagrammatically a complete testing system, including the cell of the invention and its auxiliary equipment.

Referring now to these drawings, and in particular to Figure 1, the main body of the cell of my invention comprises a horizontal, thick-walled, hollow cylinder 10, preferably formed of stainless steel or similar material not subject to corrosion by common corrosive agents. Cylindrical cell 10 is provided with the end members 11 and 12 preferably connected thereto by tapered tool-joint threads which are simultaneously strong and easily and quickly opened and closed.

Fitting within the horizontal bore of cell cylinder 10 is a piston having a body 14 carrying chevron packing rings 15 and 16 facing in opposite directions and compressed respectively by rings 17 and 18 secured by screws to the piston body 14. Fastened by threads or similar means to the piston 14 is a piston rod 20 extending through the end member 11.

Fluid leakage around the piston rod 20 is prevented by a packing gland including chevron packing rings 22 tightened by a packing nut 23 which is part of a removable packing assembly 24 of the unsupported-area-type which includes surrounding washers 25 and 26 of plastic material, such as the tetrafluoroethylene polymer known commercially as Teflon, and a neoprene ring 27. A backing ring 28 in contact with the inner end of end member 11 maintains the packing assembly 24 in place around the piston rod 20, so that the cell is sealed against hydraulic fluid leakage either past the piston rod or through the tool-joint threads.

The end of cylinder 10 opposite the piston rod 20 is closed by a thick, circular glass disc 31, preferably slightly larger in diameter than the internal bore of cylinder 10, and provided by a surrounding V-ring packing 32. Glass disc 31 is backed up and supported against the internal cell fluid pressure by a metal disc 33 having a narrow vertical slot 34 just slightly greater in length than the diameter of the inner bore of cell cylinder 10 and extending diametrically thereacross. Disc 33 is supported and held in place by the end member 12, and registering pins 35 and 36 in the disc 33 engaging holes drilled into the body of cylinder 10 maintain slot 34 vertical and prevent disc 33 from turning when end member 12 is rotated to tighten the assembly and seal that end of the cell 10.

Extending into or through the wall of cylinder 10 are a number of wells, such as the thermocouple wells 40, and ducts, such as the ducts 41 and 42, which pass through the cylinder wall behind piston 14—that is, at the end of the cell adjacent piston rod 20. Duct 41 is connected by a tubing 44 to a by-pass valve 45 and to the outlet of a pump 46 which has its inlet connected to a hydraulic oil reservoir 47, so that by operating pump 46 with valve 45 closed hydraulic oil is forced into the space behind piston 14, moving it toward the right on the diagram and thereby decreasing the cell volume enclosed between the piston and glass disc 31. To the duct 42 is connected a tubing 48 leading to a pressure gage 49 by which the pressure of the hydraulic oil in the space behind piston 14 can be determined to indicate the pressure of the test fluids within the portion of cell 10 to the right of the piston.

As the effective area of the left side of piston 14 is less than that on the right due to the area of piston rod 20, the pressure of the hydraulic fluid indicated by gage 49 is always higher than the pressure of the test fluids; but, since the ratio of areas is a constant, the factor of proportionality of the pressures is a constant. Because of the smooth sealing surfaces and the lubrication of the piston and rod packings by graphite, the friction of these packings is negligible in determining the cell pressure and volume.

To a similar duct 51 in the cell body 10 at the end adjacent glass disc 31 is connected a tubing 52 extending from a valve 53 through which a sample may be introduced into the cell space to the right of piston 14. Duct 51 preferably enters cell 10 adjacent the lower end of slot 34, while a similar duct 55 passes through the wall of cell 10 near the top end of slot 34. In series between ducts 51 and 55 is connected a by-pass tubing line 56 including a magnetically actuated pump 57, so that fluid can be circulated by pump 57 between the bottom and top of the cylinder 10 to agitate the fluids and assist in more rapidly reaching equilibrium condition of the phases within the cell. A valve 58 in a branch of line 56 adjacent duct 55 permits the introduction or drawing off of vapor samples from cell 10.

While the cell contents may be viewed at all times directly through the slot 34 and glass-disc window 31, it is preferred to place a vertical 45-degree mirror 61 at the end of the opening in end member 12, together with a lamp 62 in a reflector housing 63 for illuminating the cell contents, so that observations may be carried out from a position at one side of the cell.

The position of piston 14 and hence the volume within the cell bore between the piston and window 31 is indicated by an index member 65 adjacent a scale 66 fixed relative to the cell cylinder 10, index member 65 being attached by a coupling 67 to the projecting end of piston rod 20. Thermocouples 68 in thermocouple wells 40 indicate at any desired location the temperature of the cell body and hence of the fluids within the cell after thermal equilibrium has been reached.

Figure 2 shows more completely an auxiliary system used for testing operations with the cylindrical cell 10. As shown in this figure, the cell assembly is surrounded by a thermal jacket 70 within which is circulated air at a thermostatically controlled temperature from a suitable source 71 of heat or refrigeration to maintain the temperature of the cell 10 at a desired value.

The pump 46 actuating the cell piston 14 preferably comprises a cylinder 72 enclosing a piston 73 and forming a double-acting pump with a polish rod 74 extending from each end of the piston 73 into a pair of high-pressure cylinders 75 and 76. Through check valves 77 and 78, which pass fluid only in the direction of the adjacent arrows, hydraulic oil is withdrawn from the reservoir 47 alternately into the cylinders 75 and 76 and then alternately forced through the similar check valves 79 and 80 into the pressure lead 44 and thence into the cell cylinder 10 behind piston 14 to move it to the right.

Piston 73 is actuated by compressed air or other fluid from a supply line 82 which acts alternately on opposite sides of the piston 73 through the solenoid-actuated valves 83 and 84 controlled by limit switches 85 and 86 having contacts mounted respectively on the polish rod 74 and on each of the high-pressure cylinders 75 and 76. Valves 83 and 84 alternately admit compressed air to, and vent it from, the opposite sides of piston 73, causing it to reciprocate and force fluid from reservoir 47 into the cell 10.

While the pressure within the cell 10 can be directly measured, it is preferred to measure it indirectly by noting the pressure applied to the hydraulic oil as indicated by a pressure gage 49. If the observed pressure is less than some upper limit such as 5,000 pounds, it is more accurately indicated by a second pressure gage 88 connected through a valve 89 to the pressure line 48 extending to the gage 49.

As indicated in Figure 2, the entire contents of cell 10 and, in particular, the interface between the liquid and vapor and any additional interfaces within the cell liquids are observed and accurately measured by a cathetometer telescope 91 which is trained on the 45-degree mirror 61. Such additional interfaces within the condensed liquids are rare but have been observed with this cell, whereas their existence would probably never be known with a cell offering only limited visibility.

Coupled to the input tubing 52 and valve 53 is an injector cell 94 and a valve 93 through which samples are introduced for testing. The injector pump or cell 94 comprises a pressure cylinder 95 enclosing a polish rod piston 96 which is actuated by a hydraulic piston 97 of somewhat larger area in a cylinder 98 to which hydraulic oil from a reservoir 99 is supplied under pressure by a pump 100. A by-pass line 101 controlled by a valve 102 extending between the outlet of pump 100 and reservoir 99 provides for returning oil to the reservoir and thus for reciprocating pistons 97 and 96 and controlling the entrance of or forcing fluids into the cell 10. A rod 103 extending from piston 97 and packed off through the end of cylinder 98 carries an index 104 which indicates against a stationary scale 105 the exact position of piston 96 and hence the exact volume of the liquid introduced into cell 10 by the injector cell 94. Material to be tested introduced through the valve 93 is forced by the injector cell pump 94 into the cell 10 regardless of the pressure therein.

Connected to the tubing 52 are valves 110 and 111 through which liquid samples may be withdrawn into a liquid sample bomb 112 closed by a valve 113. Through the valve 58 and a similar valve 114 a vapor sample may be withdrawn from the top part of cell 10 into a vapor sample bomb 115 closed by a valve 116. Through valves 117, 118, and 119 a vacuum pump 120 is connected respectively to the upper and lower parts of the cell 10, to the sample bomb 115, to bomb 112, and to the sample inlet system at a point between valves 93 and 53. By manipulation of the various valves, it is apparent that pump 120 can be used to evacuate the entire system or any desired portions thereof.

In operation, after a given sample of gas and liquid, either in single or multiple phase, has been introduced through valve 93 and pump 94 into the cell 10, valves 110 and 58 being closed, it is necessary only to apply hydraulic pressure by operating pump 46 to move cylinder 14 to the right to decrease progressively the cell volume and raise the pressure on the test fluids. This is done with the valve 45 closed. If it is desired to move piston 14 to the left to increase the cell volume, valve 45 is simply opened to allow hydraulic oil to flow back into reservoir 47 under pressure of the test fluids within cell 10.

With the piston 14 at any given position, the cell fluids are agitated by operating pump 57 to transfer liquid from the bottom to the top of cell 10 for a period of time, during which the temperature of the cell and surrounding air is maintained at whatever value is desired. When an equilibrium has been reached between the vapor at the top of cell 10 and the liquid on its bottom, the positions of the liquid-vapor interface and of any other interface are noted and accurately measured by the cathetometer telescope 91. A record is also made of the volume, pressure, and temperature of the cell by reference respectively to the scale 66, the gage 88, and an indicator 69 connected to thermocouple 68.

To continue the testing, the pressure on the mixture within cell 10 is changed as desired by actuating piston 14 to a new position as indicated against scale 66, and the mixture is again brought to equilibrium by agitation with the pump 57, after which the respective vapor and liquid volumes are noted by the position of the interface against glass disc 31, and the pressure and temperature are recorded.

A particular advantage of cell 10 as described is that no displacing mercury is employed which could come into contact with the sample fluids being tested, so that no chemical reactions, such as might occur if hydrogen sulfide were a component of the mixture, can take place. Likewise, the volume enclosed within the cell 10 is of such a shape that only very small amounts of vapor or liquid are necessary to make their appearance known at the bottom or at the top of the slot 34. Thus, both the dew point and the bubble point of mixtures can be determined with high accuracy where it is important to know the exact conditions under which a single-phase mixture just begins to separate into two phases.

Calibration of the cell is a simple matter, as the cell volume enclosed between the glass disc 31 and piston 14 is a simple geometrical shape so that the variation in volume with position of the piston 14 is calculable and linear. Due to the tool-joint coupling between end member 12 and cylindrical cell body 10, complete disassembly and removal of the glass disc 31 for replacement or for cleaning it and the interior of the cell and reassembly for further testing can be performed in only a few minutes. Not the least of the advantages is the fact that a cross section of the entire liquid and gas sample is visible in one field of view, so that in operation no time is lost in manipulating the fluids to bring an interface to one particular position for observation or measurement. This results in a worthwhile saving in operating time.

While I have described my invention in terms of the foregoing specific details, it is to be understood that these are for purposes of illustration only, and the invention should not be considered as limited solely to the details described, as these are subject to modification and variation by those skilled in the art. The scope of the invention should properly be ascertained by reference to the appended claims.

I claim:

1. A cell for observing phase-equilibrium conditions of fluids under variable conditions of temperature and pressure comprising a thick-walled, horizontal, cylindrical cell having a uniform-diameter bore extending along the axis thereof, a thick, transparent circular window perpendicular to said axis sealing and forming one end of said bore, a piston in said bore closely engaging the walls thereof and forming with said window a cylindrical space of variable volume adapted to contain a fluid sample, means attached to said piston for indicating outside of said cell the piston position within said bore, means for applying hydraulic pressure to move said piston and vary the cell volume between said piston and said window, said piston being movable substantially into contact with said window, whereby the minimum cell volume is substantially zero, means for determining the pressure of a fluid sample within said cell volume, means for maintaining said cell and said fluid sample at a given temperature, and at least one fluid conduit extending through the wall of said cell whereby a fluid sample may be introduced or removed from said cell volume.

2. A cell for observing phase-equilibrium conditions of fluids under variable conditions of temperature and pressure comprising a thick-walled, horizontal, cylindrical cell having a uniform-diameter bore extending along the axis thereof, a thick, transparent circular window perpendicular to said axis closing and forming one end of said bore, a piston in said bore, a rod attached to said piston and extending through the end of said cell opposite from said window, packing means slidably sealing between said piston and said bore and around said rod, an index attached to a portion of said rod projecting from said cell, a scale fixed relative to said cell and adjacent said index for observing the position of said rod and hence of said piston within said cell, means for applying fluid pressure in said bore behind said piston to move it towards said window, said piston being movable substantially into contact with said window, whereby the minimum cell volume is substantially zero, a pressure gage actuated in proportion to the pressure of a fluid sample in said bore between said piston and said window, and fluid inlet and outlet conduits both extending from said bore through the wall of said cell near the end thereof adjacent said window, whereby a fluid sample may be introduced or removed from said cell.

3. A cell for observing phase-equilibrium conditions of fluids under variable conditions of temperature and pressure comprising a thick-walled, horizontal, cylindrical cell having a uniform-diameter bore extending along the axis thereof, a piston in said bore closely engaging the walls thereof, means for applying hydraulic pressure to one side of said piston to move it along said bore, a rod attached to said piston for indicating outside of said cell its position within said bore, packing means slidably sealing between said piston and bore and around said rod thereby closing off one end of said bore, a thick, transparent, circular window perpendicular to said axis closing the other end of said bore and forming with said piston a variable cell volume which substantially approaches zero as said piston approaches said window, a resilient sealing ring surrounding said window, a metal disc having a slot extending across its center adapted to support said window against fluid pressure within said bore, said slot providing a vertical cross-section view across the entire height of said cell, interengaging projections between said disc and the body of said cell to maintain said slot vertical and prevent rotation of said disc, a threaded member having an axial bore holding said cell and window in place in said cell, conduit means whereby a fluid sample may be introduced and removed from said bore, and means for indicating the pressure of a fluid in said bore.

4. A cell for observing phase-equilibrium conditions of fluids under variable conditions of temperature and pressure comprising a thick-walled, horizontal, cylindrical cell having a uniform-diameter bore extending along the axis thereof, a thick, transparent window perpendicular to said axis closing and forming one end of said bore, a piston in said bore, a rod attached to said piston and extending through the end of said cell opposite from said window, packing means slidably sealing between said piston and said bore and around said rod, an index attached to a portion of said rod projecting from said cell, a scale fixed relative to said cell and adjacent said index for observing the position of said rod and hence of said piston within said cell, means for applying fluid pressure in said bore behind said piston to move it towards said window, a pressure gage actuated in proportion to the pressure of a fluid sample in said bore between said piston and said window, fluid inlet and outlet conduits both extending from said bore through the wall of said cell near the end thereof adjacent said window, whereby a fluid sample may be introduced or removed from said cell, a closed tubular conduit outside of said cell and extending between said fluid inlet and outlet conduits, and a pump in said tubular conduit, whereby fluids may be withdrawn and reintroduced into said cell to effect agitation of said fluids.

MICHAEL J. RZASA.

References Cited in the file of this patent

UNITED STATES PATENTS

| Number | Name | Date |
|---|---|---|
| 2,380,082 | Sloan | July 10, 1945 |